US00RE34889E

United States Patent [19]

Fogarty et al.

[11] E Patent Number: Re. 34,889

[45] Reissued Date of Patent: Apr. 4, 1995

[54] VEHICLE SERVICE RAMP

[76] Inventors: William W. Fogarty, 2408 Bradley Dr., Harrisburg, Pa. 17110; Phillip M. Friday, 1923 Walnut St., Camp Hill, Pa. 17011

[21] Appl. No.: 94,351

[22] Filed: Jul. 21, 1993

Related U.S. Patent Documents

Reissue of:

[64] Patent No.: 5,033,146
Issued: Jul. 23, 1991
Appl. No.: 544,387
Filed: Jun. 27, 1990

[51] Int. Cl.[6] ..... E01D 1/00

[52] U.S. Cl. ..... 14/69.5; 254/88

[58] Field of Search ..... 14/69.5; 248/352; 254/88

[56] References Cited

U.S. PATENT DOCUMENTS 1,448,250 3/1923 Au Miller ..... 254/88
2,924,427 2/1960 Larson ..... 254/88
3,863,895 2/1975 Grew et al. ..... 14/69.5 X
4,327,896 5/1982 Whitehead ..... 254/88

FOREIGN PATENT DOCUMENTS 956180 10/1974 Canada .

*Primary Examiner*—Peter R. Brown
*Assistant Examiner*—Nancy Connolly Mulcare
*Attorney, Agent, or Firm*—Eugene E. Renz, Jr.

[57] ABSTRACT

A lightweight, high strength, portable vehicle service ramp capable of being used by aerodynamic vehicles and heavy trucks. The ramp is solid on all sides with integrated handles on the sides and rear. The base and rear of the structure are covered with a corrosive-and-wear resistant material. The incline and top plane area of the ramp are covered with non-skid material. A wheel stop is provided in a Configuration to reduce kickback. The internal construction is a system of cross members running longitudinally and transversely to provide weight bearing capability. Ramp design provides for movement, storage and transporting efficiency.

10 Claims, 4 Drawing Sheets

VEHICLE SERVICE RAMP

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to raising a vehicle quickly and safely. More specifically, the present invention relates to portable to portable ramps that are driven upon to elevate vehicles and allow acces to the undercarriages for service.

2Description of Prior Art

Today's cars have been designed with fuel conservation and quietness in mind. The achieve these qualities, automotive companies have designed and manufactured vehicles with very low profile front ends. These designs preclude the use of prior ar portable ramps because they strike a vehicle's body before it is raised sufficiently to clear the structures.

This is not the case when previous are portable ramps are used on less aerodynamics vehicles such as trucks. However, the higher strength requirement necessary for repeated daily use by higher weight vehicles mandate the use of bulky, extremelty heavy portable structures.

Thus, in the marketplace today there are generally two types of prior art portable rams available:

1. Those manufactured for use on lighter vehicles that cannot accommodate most cars manufactured during the past five years. There ramps generally weigh less than twenty pounds each and achieve this attribute through sacrifice of weight bearing capacity.

2. Those manufactured for use on heavier vehicles such as trucks where weight bearing capcity and strength under continuous use are a consideration. These types of ramps are bulky and can weigh in excess of 50 pounds.

In addition to these shortcomings there are other drawbacks when using prior art portable ramps.

Prior art ramps are unstable and prone to move away from a vehicle when they are driven upon. This is due to the small amount of surface contact made with the ground and the narrow base of current art structures for incline rate and total height achieved. This inadequate surface contact with the ground also creates the tendency for current art ramps to damage asphalt because they do not evenly displace the forces applied to them by the weight of the vehicle.

Previous art will also illustrate that handles to ease lifting and movement of the structures are absent. Various edges that are used in place of handles are sharp and off center, making lifting and maneuvering difficult.

Storage of previous art ramps in achieved by setting them on top of each other, which causes binding and difficulty in separating, or side by side which takes up additional space. Transporting previous art ramps is also difficult for the same reasons and because they have a tendency to move due to inadequate ground surface contact and a high center of gravity.

Most previous art ramps do have some type of stop to halt tire rotation when the tire reaches the top plane of the ramp. However, previous art has not satisfactorily addressed the problem of kickback which occurs when a vehicle rides upon the stop. Kickback raises the incline portion of the ramp and can damage the undercarriage or rocker panel of vehicles.

This compilation of drawbacks precludes the use of piror art lightweight portable ramps on most cars of current design and makes their use difficult on the remainder accepting them. In addition, portable ramps designed for commercial use have, to date, been bulky, heavy and difficult to use.

These inadequacies have been further crystallized by changes in society which dictate that vehicle service organization be capable of providing maintenance at a client's location.

Many companies now operate 24 hours a day and weekends. Companies no longer want to take their vehicles out of operation to receive oil changes and other lubrication and fluid services. This phenomenon requires that required regular maintenance be performed at the site the vhicle is located. In addition to company vehicles the expansion of office complexes into the suburbs allows for maintenance procedures to be performed while employees are working. During the next decade this trend is expected to continue.

As a result of these changes in vehicle design and vehicle service concepts thre has been created the need for a light-weight, more easily handled, transported and stored ramp that is stronger, more stable, easier to use and adaptable for use on all types of vehicles.

SUMMARY OF THE INVENTION

With the above in mind, an object of the present invention is to provide a ramp that is usable by a wide variety of cars, vans, trucks and other automotive vehicles.

It is also an objects of the present invention that it be lightweight and have a load bearing capacity in excess of 10,000 pounds.

Another object of the presented invention is that it be less prone to move when driven upon. Still, a further objects is that it have a rduced tendency to kickback.

Additionally, it is an object of the invention that it take up less space in storage and have the capability to be stored more efficiently both horizontally and vertically.

Another object is that is be much easier to drive a vehicle upon. It is also an object of the invention that it be easier to maneuver and lift. A last objects is that is not cuase damage to road surfaces.

These objects as well as other objects which will become apparent from the discussion that follows, are achieved, according to the present invention by providing a vehicle service ramp that is solid on all sides with integrated handles on the sides and rear. In the preferred embodiment of the invention the rear of the structure is covered with a corrosive-and-wear resistant flexible compound. The top plane and incline of the structure are covered with a skid resistant material. A stop is integrated onto the top plane of the ramp, making contact with the wheel forward of the rear of the struture and in such configuration to greatly reduce kickback by better displacing forces that cause this phenomenon. The rear of the ramp is flat and serves as a support for vertical storage of two similar structures base to base; or horizontal storage can be achieved by setting similar structures base to base on their sides. Internal construction of the invention is made up of a system of interlocking vertical cross members throughout the structure.

The foregoing and other objects, features and advantages of the invention will be apparent from the following more particular description of the preferred embodiments of the invention, as illustrated in the accompanying drawings.

DETAILED DESCRIPTION OF INVENTION

Figure 1:
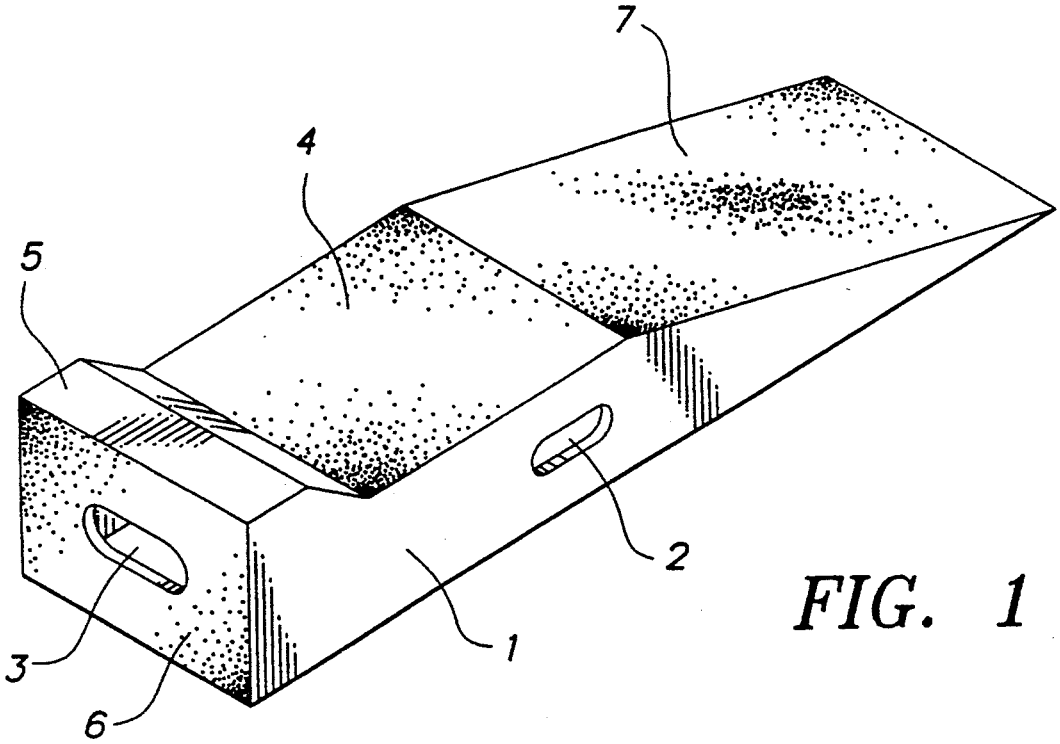
FIG. 1 is a ¾ side view showing the side and rear handles. The opposite side is a mirror image.

Refer now to FIG. 1, which is an overall drawing of the preferred embodiment of the invention. The preferred vehicle service ramp in accordance with the present invention has solid vertical sides 1 and rear 6 with side integrated handles 2 and a rear integrated handle 3. The incline 7 slopes upward toward a top flat plane 4. The side handles 2 are situated to provide for an approximate 52/48 percent weight distribution. All handles have rounded edges for comfort and allow for easy pick up and maneuvering of the structure under vehicles.

The incline 7 and top flat plane 4 area of the ramp are solid and covered with a skid resistant material to allow for better traction in climbing the incline 7 and stopping. The rear 6 of the ramp is covered with a flexible corrosive-and-wear resistant material to protect the structure when storing or transporting vertically.

The tire stop 5 is brought forward and formed in such a configuration so that pressures exerted on it are better displace to reduce kickback. The rear 6 of the stop also provides stability when storing the ramp vertically.

The preferred angle of the incline 7 is fifteen degrees. This incline 7 allows for use on all vehicles sufficiently raises vehicles for service and is easy to ascend.

Figure 2:
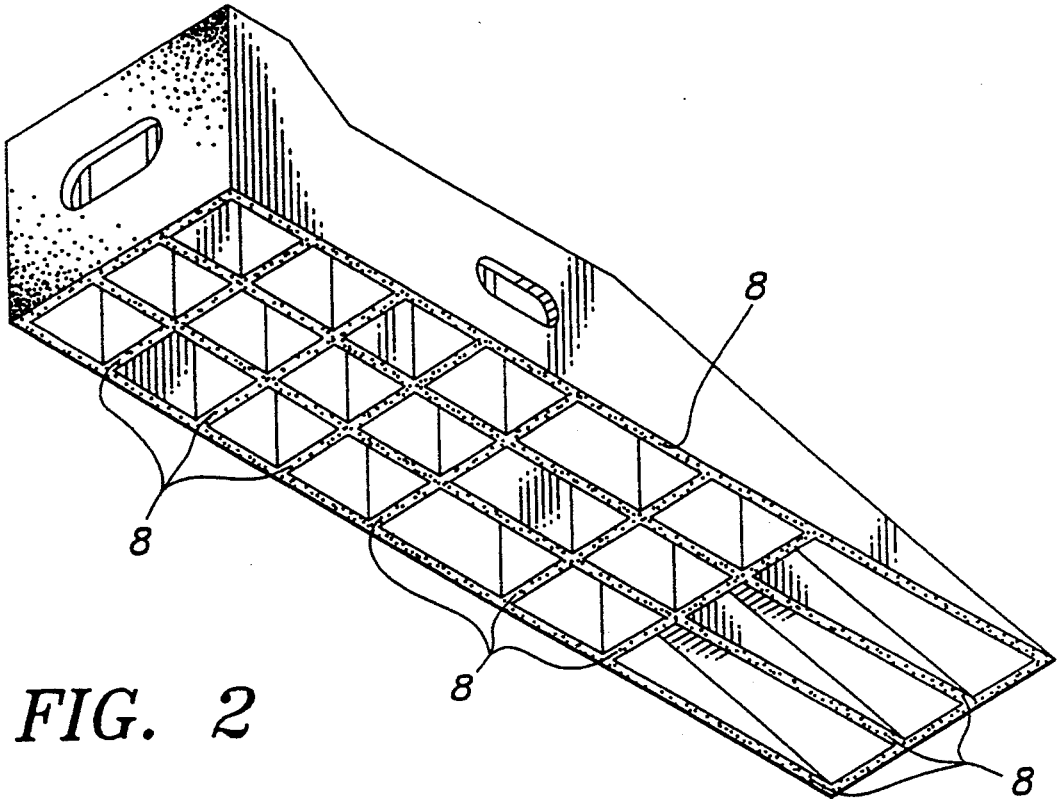
FIG. 2 is a view from the bottom.

As shown in FIG. 2, the base 8 of the structure allows greater contact with the ground, thus lessening the tendency for movement when driven upon; and displacing weight more evenly to avoid damaging asphalt and other surfaces.

Figure 3:
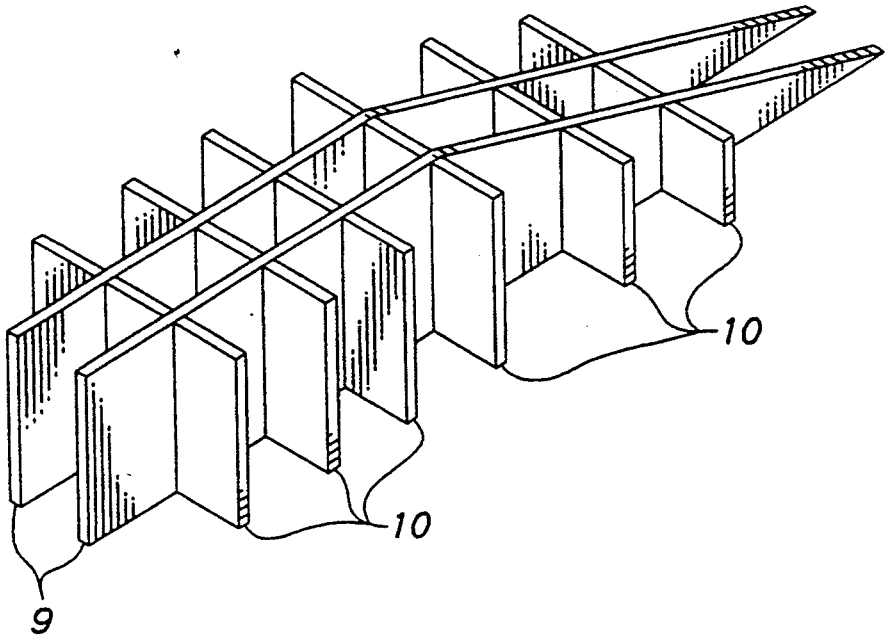
FIG. 3 is a schematic of the internal structure from ¾ side view.

As shown in FIG. 3, the structure's strength is derived from a system of interlocking vertical cross members 9, 10 which run longitudinally and transversely throughout the inside of the ramp. Individual members are wall type structures. The outermost transverse support members 1 serves as vertical side walls. The outermost traverse support member serves as the vertical rear wall 6. Internal crossmembers 9, 10 are integrated into the base, 8 incline, 7 top plane, 4 rear, 6 and sides 1. All components are held together by screws and by a waterproof glue type compound that is applied at all points of contact making the entire structure essentially one piece.

Preferably, the entire structure is made of very dense wood such as marine grade plywood, sealed and painted or a mold of the structure could be formed of a high strength plastic type compound.

Figure 4:
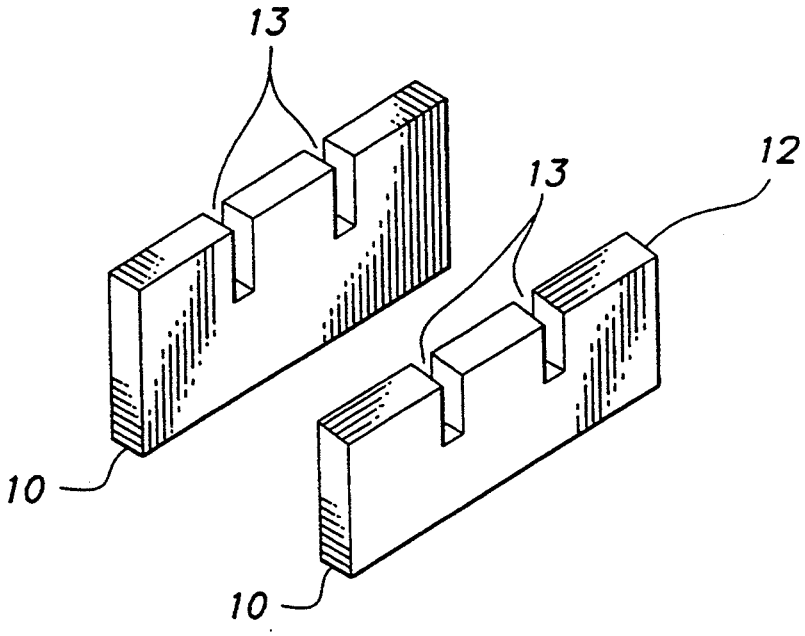
FIG. 4 is a cut away view of an internal transverse support panel.

FIG. 4 illustrates an internal transverse suport member 10 that is provided in a variety of heights to accommodate the incline 7 and the top plane 4. The top edge of the transverse members 12 supporting the incline 7 are beveled. The cut out areas 13 are integrated into the longitudinal support members 9.

Figure 5:
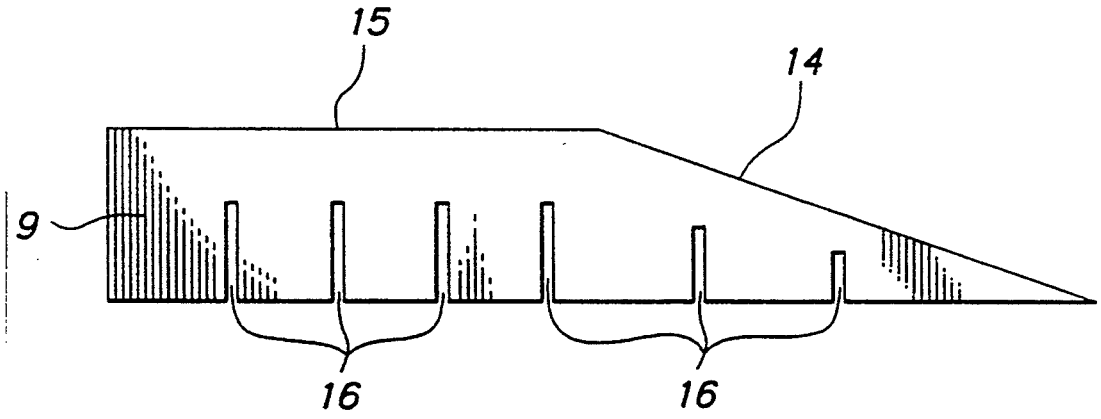
FIG. 5 is a cut away view of a longitudinal support panel.

FIG. 5 shows a longitudinal support member 9. The sloped area 14 supports the incline 7 and rises to a flat surface 15 to support the top plane 4. The cut out areas 16 are integrated into the transverse support members 10.

Figure 6:
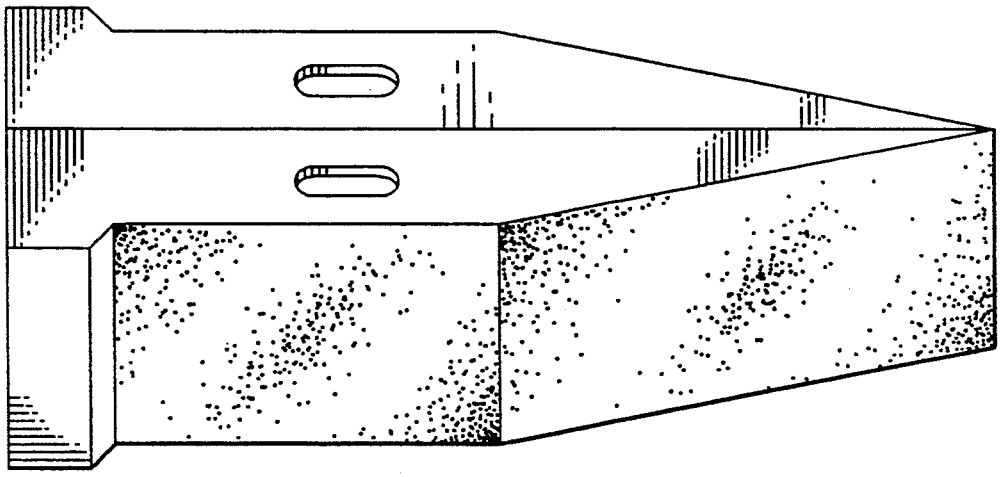
FIG. 6 is a view of two structures being stored or transported horizontally.

FIG. 6 illustrates two of the structures being transported horizontally as they would be inside the trunk of a car.

Figure 7:
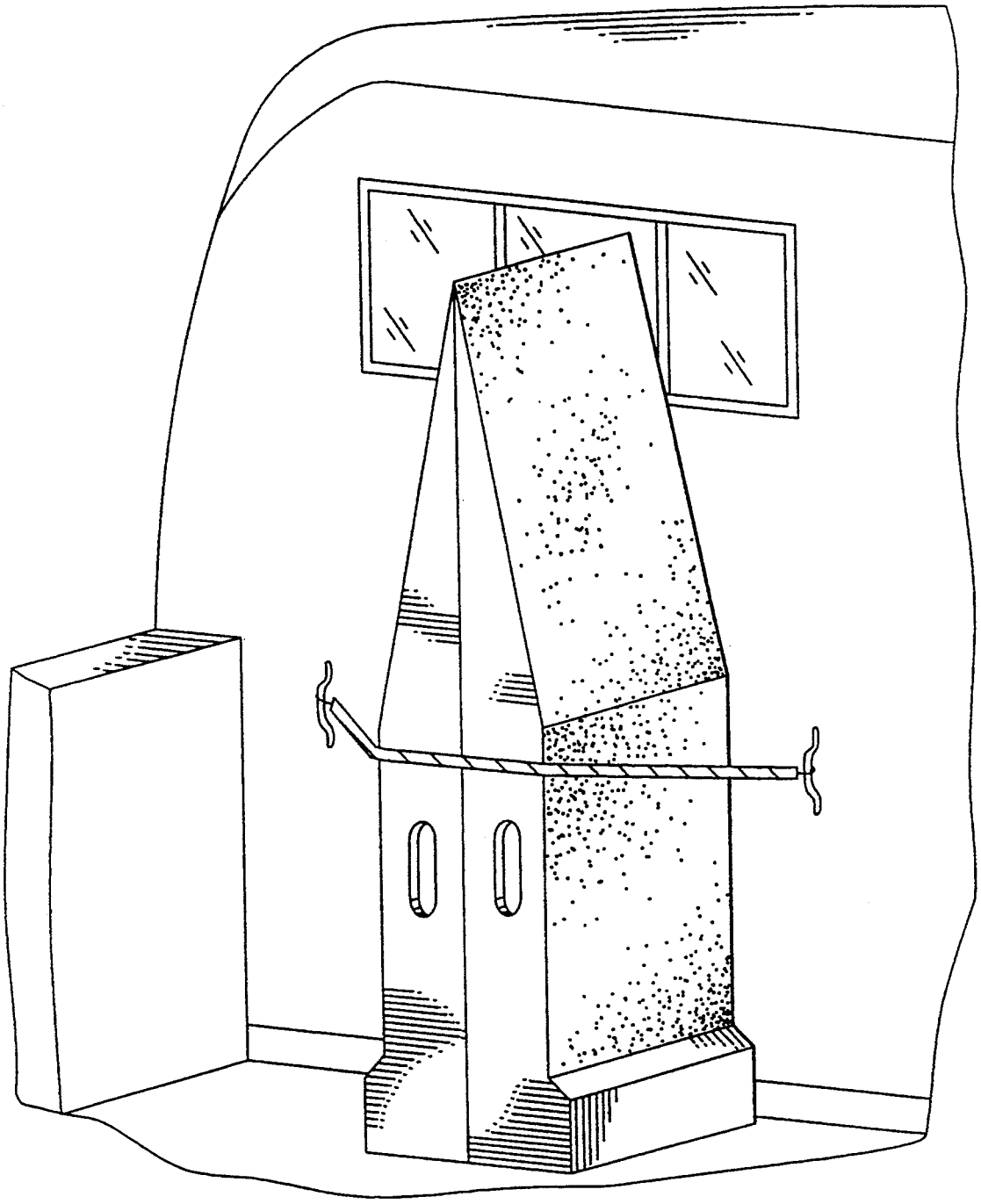
FIG. 7 is a view of two structures being stored or transported vertically.

FIG. 7 shows two of the structures being transported vertically with a cord securing them as they would be inside a commercial van.

With the above construction it will be seen that in constrast to prior art lightweight vehicle service ramps the present invention is much stronger, much easier to drive upon, maneuver, transport and store. It will also be seen to be able to be used by all vehicles in the marketplace, eliminate damage to road surfaces and its wheel stop will be shown to be an improvement over current art in reducing kickback.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by the detailed description but rather by the claims appended hereto.

What is claimed is:

1. A lightweight, high strength, vehicle service ramp to elevate and support vehicles that they may be serviced, comprising, (a) an exterior structure formed with vertical sides which are the outermost longitudinal support members, and rear, which is the outermost transversal support member, including an inclined top surface sloping upwards toward a top flat plane surface, (b) a system of interlocking vertical cross members running longitudinally and transversely throughout the length and width of the structure from which the ramp derives the strength to support vehicles as they are being elevated and stopped, (c) a system of interlocking cross members serving as support members with individual members running longitudinally and transversely, formed with the outermost longitudinal support members serving as vertical side walls and the outermost integrated transversal support member serving as the vertical rear wall, (d) internal cross members serving as the support structure, comprised of longitudinal and transversal members with longitudinal members extending lengthwise throughtout the interior of the structure, being tapered toward the lowest end of the member and being fashioned in such a manner as to accommodate interlocking transversal members that extend widthwise the interior width of the structure and are of a height and vevelled in such a manner as to conform to the plane and incline of the longitudinal members creating an interior support structure that is integrated into the interior of the structure, (e) means interconnecting all internal interlocking longitudinal and transversal cross members with the sides, incline, rear and top plane of the structure to form a structure that is essentially one piece and that is of an incline and of sufficient height that motor vehicle tire secure purchase throughout their upward travel from the lowest portion of the inclined surface until the vehicle's tire are resting on the top flat plane surface, (f) a base comprised of the lowermost portions of the interlocking internal and external longitudinal and transversal members, (g) stop means provided, situated forward of rear member and formed on its rearward surface in such a configuration to atabilize the structure when transporting or storing vertically.

2. The ramp of claim 1 wherein the structure is comprised of a plastic type compound.

3. The ramp of claim 1 wherein the structure has a solid exterior formed with integrated handles in the sides and rear.

4. The ramp of claim 1 whereby the incline and/or top plane are covered with skid-resistant material.

5. The ramp of claim 1 whereby the base and rear are covered with a corrosive and wear resistant flexible material.

*6. A lightweight, high strength vehicle service ramp to elevate and support vehicles that they may be service, comprising;*

*(a)an exterior structure formed wth generally vertical sides, including an inclined top surface and a flat top surface;*

*(b)a honeycomb system of interlocking members disposed through-out the length and width of the structure from which the ramp derives the strength to support vehicles as they are being elevated and stopped, said system comprising interlocking longitudinal and transversal cross members serving as support members wherein in the outermost longitudinal support members serve as vertical side walls and the outermost integrated transversal support member serves as the vertical rear wall; and*

*(c) means interconnecting all internal interlocking longitudinal and transversal cross members with the sides, inclined, rear and top surface of the structure to form a structure that is essentially on piece and that is of an incline and of sufficient height that motor vehicle tires secure purchase throughout their upward travel from the lowest portion of the inclined surface until the vehicles tires are resting on the flat top surface.*

*7. The ramp of claim 6, wherein the structure is a molded high strength plastic type compound.*

*8. A lightweight, high strenght vehicle service ramp to elevate and support vehicles that they may be serviced, comprising:*

*(a) an exterior structure formed with generally vertical sides, including an inclined top surface and a flat top surface;*

*(b) a honeycomb system of interlocking members disposed through-out the structure from which the ramp derives the strength to support vehicles as they are being elevated and stopped, said system comprising interlocking cross members serving as support members wherein the outermost longitudinal support members serve as vertical side walls and the outermost integrated transversal support member serves as the vertical rear wall; and*

*(c) means interconnecting all internal interlocking longitudinal and transversal cross members with the sides, inclined, rear and top surface of the structure to form a structure that is essentially one piece and that is of an incline and of sufficient height that motor vehicle tires secure purchase throughout their upward travel from the lowest portion of the inclined surface until the vehicles tires are resting on the flat top surface.*

*9. The ramp of claim 8, wherein the structure is comprises of a plastic type compound.*

*10. The ramp of claim 8, wherein the structure is a molded high strength plastic type compound.*

* * * * *